F. G. HIRST.
GREASE CUP.
APPLICATION FILED MAY 10, 1919.

1,318,669.

Patented Oct. 14, 1919.

Inventor:
Franklin G. Hirst
by Mahlon van Bostkirk
his Attorney.

UNITED STATES PATENT OFFICE.

FRANKLIN G. HIRST, OF PHILADELPHIA, PENNSYLVANIA.

GREASE-CUP.

1,318,669.  Specification of Letters Patent.  Patented Oct. 14, 1919.

Original application filed December 14, 1918, Serial No. 266,699. Divided and this application filed May 10, 1919. Serial No. 296,079.

*To all whom it may concern:*

Be it known that I, FRANKLIN G. HIRST, a citizen of the United States, residing at Philadelphia, in the county of Philadelphia and State of Pennsylvania, have invented certain new and useful Improvements in Grease-Cups, of which the following is a specification.

My invention relates to grease cups or lubricators from which the lubricant is ejected by means of pressure applied thereto, the pressure gradually lessening as the volume of lubricant diminishes, and the delivery passage being controlled by a valve movable with the pressure device so as to gradually increase the area of such passage as the pressure upon the lubricant diminishes, and is a division of my application filed December 14th, 1918, Serial No. 266,699.

The objects of the present invention are to provide a grease cup of the class described, the outlet of which is controlled by a vertically moving valve operable in a separate casing that may be secured to the shank of the usual type of grease cup, the closing movement of said valve being regulated by the pressure of the lubricant actuated upon by the plunger and compression means connected with said valve to cause a reverse movement of the same as the plunger pressure diminishes.

These and other objects I attain in the manner hereinafter set forth, reference being had to the accompanying drawings, in which:—

Like parts are referred to by like reference characters throughout the drawings.

Figure 1:
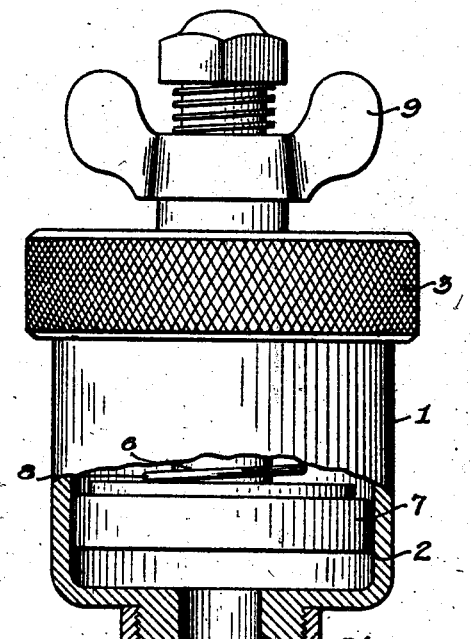
Figure 1 is a vertical sectional view of a lubricator constructed in accordance with my invention the separable casing being shown connected to a grease cup, the vertically moving valve therein being shown in an open position.

Referring to the drawings in detail the numeral 1 designates the body or cup of the lubricator, the interior portion 2 thereof comprising a receptacle for the lubricant, closed at the top by a cap or cover 3 and has at the bottom the shank 22, terminating in the cup outlet 21, interiorly threaded to engage the exterior threads of a casing 4. A separable casing 4 is provided in which a vertical moving valve 10 is adapted for vertical movement in a passage 12 in said casing.

The said cap 3 is provided with the usual threaded plunger stem 6 of a plunger 7 which fits snugly to the inner wall of the cup 1 and is acted upon by a coiled spring 8 disposed between the underside of the cover 3 and the plunger 7 and tending to constantly depress said plunger. The threaded stem 6 passes freely through an opening in the cover 3 and is provided above said cover with a winged nut 9. By means of this winged nut 9 the plunger 7 is drawn to its uppermost position in the cup.

Figure 2:
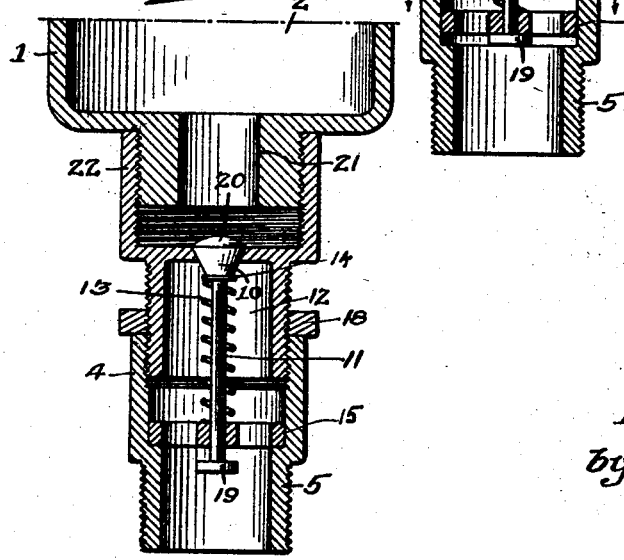
Fig. 2 is a like vertical sectional view with the vertically moving valve shown in a closed position.
Figure 3:
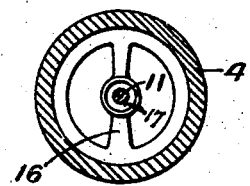
Fig. 3 is a plan view of the hollow washer used in the casing outlet taken on line 3—3 of Fig. 1.

As beforesaid a vertically moving valve 10, having the valve stem 11, is adapted for movement in the vertical opening 12 in the casing 4 as shown. A spiral spring 13 is positioned around the valve stem 11 and is disposed between the shoulder 14 of the valve 10 and the head of the hollow washer 15. Said hollow washer 15, positioned in the outlet of the casing, movable with the valve 10, normally rests upon the shoulders provided in said casing as illustrated in Figs. 1 and 2, has a web or brace 16 through which the valve stem 11 passes by means of the aperture 17 therein; the said hollow washer is particularly illustrated in Fig. 3.

A lock nut 18 is provided in the casing 4, as illustrated, and a member 19 is provided on the valve stem 11 near its terminus to limit the upward travel thereof. The valve 10, is, as beforesaid, conical in form and turbinate or top shaped by reason of the cap 20 thereon. This cap provides for an absolutely sealed outlet, as illustrated in Fig. 2, when the plunger is in its uppermost position and prevents seepage of the lubricant before adjustment of the pressure means.

In operation: The separable casing 4 is threaded to the shank 22 of the usual type of grease cup.

When the plunger 7 is released from its uppermost position the greatest pressure is exerted. As the lubricant under this pressure forces the valve downwardly, said lubricant enters the opening 12, through the passage 23, and is discharged through the hollow washer 15 and the casing outlet 5. As the pressure of the plunger spring 8 lessens and thereby diminishes the flow of the lubricant the pressure of the spring 13 gains force so that when the pressure of the spring 13 is greater than that of the plunger spring 8 the valve gradually reverses its movement gradually increasing the area of the outlet 23 until the plunger has completed its stroke.

It will be obvious that to secure this result the operator will before putting the lubricator in use adjust the tension of the spring 13 by compressing the same between the shoulder 14 and the washer 15 to the required pressure, a portion of the casing structure being threaded as illustrated for such purpose. This tension is then retained by the lock nut 18.

The greatest force of the plunger is exerted, at, substantially, the first quarter part of its stroke and unless this initial pressure is throttled an excess discharge of lubricant follows; therefore the pressure of the spring 13 should be so regulated as to provide the smallest area of outlet for the lubricant when the plunger is in its upper position.

Being thus regulated the lubricant will flow through the passage 12 and the hollow washer 15 and through the casing outlet 5 to the bearing that is to be lubricated, the said casing outlet 5 being threaded to engage the threads of the bearing to be lubricated.

By reason of the valve mechanism being contained in a separable casing that is adapted to be secured to the usual type of shank outlet on grease cups, the necessity of a particular nozzle structure in which means must be provided for the positioning and movement of the valve controlling the outlet, is obviated, and the casing can be readily connected to the shank outlet of the usual type of grease cup to control the outlet thereof.

Various modifications may be made in my device without departing from the scope of my invention.

Having thus described my patent what I claim as new and desire to secure by Letters Patent is:—

1. In a grease cup provided with a spring actuated plunger and an outlet, a separable valve casing, valve mechanism therein, means to connect said casing to said grease cup whereby the outlet of said cup is controlled by said valve mechanism and compression means connected with said valve, acting in opposition to the plunger pressure, to regulate the opening movement of said valve.

2. In a grease cup provided with a spring actuated plunger and an outlet, a separable valve casing, valve mechanism therein, means to connect said casing to said grease cup whereby the outlet of said cup is controlled by said valve mechanism and compression means connected with said valve, acting in opposition to the plunger pressure, to regulate the opening movement of said valve, thereby providing means to limit the initial flow of the lubricant when the plunger is released from its uppermost position.

3. In a grease cup provided with a spring actuated plunger and an outlet, a separable casing, valve mechanism operatively positioned in said casing, means for connecting said casing to said grease cup whereby said valve mechanism, acting in opposition to the plunger pressure, controls the outlet of said cup.

4. In a grease cup provided with a spring actuated plunger and an outlet, a separable valve casing, valve mechanism therein, means to connect said casing to said grease cup whereby the outlet of said cup is controlled by said valve, compression means connected with said valve, acting in opposition to the plunger pressure, to regulate the opening movement thereof and means to limit such opening movement to a predetermined position.

5. In a grease cup provided with a spring actuated plunger and an outlet, a separable casing, valve mechanism operatively positioned in said casing, means for connecting said casing to said grease cup whereby said valve is caused to move vertically in said casing by the pressure of the lubricant as the plunger descends and compression means in connection with said valve, acting in opposition to the plunger pressure, to cause a reverse movement thereof as the plunger pressure diminishes.

In testimony whereof I affix my signature.

FRANKLIN G. HIRST.

Copies of this patent may be obtained for five cents each, by addressing the "Commissioner of Patents, Washington, D. C."